(12) United States Patent
Deland et al.

(10) Patent No.: US 6,793,296 B2
(45) Date of Patent: Sep. 21, 2004

(54) ENDLESS TRACTION BAND WITH ASYMMETRICAL SUPPORT

(75) Inventors: André Deland, Drummondville (CA); François Duquette, Drummondville (CA)

(73) Assignee: Soucy International Inc., Drummondville (CA)

( * ) Notice: Subject to any disclaimer, the term of this patent is extended or adjusted under 35 U.S.C. 154(b) by 0 days.

(21) Appl. No.: 10/267,115

(22) Filed: Oct. 9, 2002

(65) Prior Publication Data

US 2004/0070274 A1 Apr. 15, 2004

(51) Int. Cl.[7] .................. B62D 55/24; B62D 55/275; F16G 1/04
(52) U.S. Cl. ...................... 305/167; 305/178
(58) Field of Search .................. 305/185, 165, 305/167, 170, 173–174, 178, 46, 193, 195, 181, 160, 179, 180, 199

(56) References Cited

U.S. PATENT DOCUMENTS

| | | | |
|---|---|---|---|
| 3,472,563 A | * | 10/1969 | Irgens ................. 305/112 |
| 3,722,962 A | * | 3/1973 | Cooper ................ 305/180 |
| 5,312,176 A | | 5/1994 | Crabb |
| 5,363,936 A | | 11/1994 | Grawey et al. |
| 5,484,321 A | * | 1/1996 | Ishimoto ............ 446/433 |
| 5,690,398 A | * | 11/1997 | Pribyl ................. 305/162 |
| 5,749,423 A | | 5/1998 | Burckhartzmeyer et al. |
| 5,894,900 A | | 4/1999 | Yamamoto et al. |
| 6,129,426 A | | 10/2000 | Tucker |
| 6,135,220 A | | 10/2000 | Gleasman et al. |
| 6,199,646 B1 | | 3/2001 | Tani et al. |
| RE37,174 E | | 5/2001 | Grawey et al. |
| 6,296,329 B1 | | 10/2001 | Rodgers et al. |
| 6,494,548 B2 | * | 12/2002 | Courtemanche ...... 305/168 |
| 6,609,771 B2 | * | 8/2003 | Morin et al. ......... 305/178 |
| 6,733,093 B2 | | 5/2004 | Deland et al. |
| 2003/0047996 A1 | | 3/2003 | Soucy et al. |

* cited by examiner

Primary Examiner—Russell D. Stormer
Assistant Examiner—Jason R. Bellinger
(74) Attorney, Agent, or Firm—Robert Brouillette; Ronald S. Kosie; Gaétan Prince

(57) ABSTRACT

This invention relates to an endless traction band that is used to propel tracked vehicles and, more particularly, to an improved traction band made from a polymer adapted to travel over a drive sprocket, a plurality of guide wheels and a tension wheel. The inner surface of the endless traction band includes a different lug configuration which allows for the endless traction band to be installed more efficiently on a tracked vehicle.

13 Claims, 6 Drawing Sheets

ENDLESS TRACTION BAND WITH ASYMMETRICAL SUPPORT

FIELD OF INVENTION

This invention relates to an endless traction band that is used to propel tracked vehicles [i.e., vehicles which use endless traction bands rather than tires to contact the terrain over which they are driven, e.g., tractors, tanks, bulldozers, etc.] and, more particularly, to an improved elastomeric traction band comprising, along its inner surface circumference, a different lug configuration.

BACKGROUND OF THE INVENTION

Numerous types of vehicles are frequently used on terrain where it is difficult for pneumatic tires to operate. Both defense vehicles, such as tanks and amphibious vehicles, and civilian vehicles, such as tractors and recreational vehicles, are sometime utilized on terrains which are very soft, for example sand surfaces. Pneumatic tires are not capable of efficient operation on such soft surfaces, as they tend to burrow into the surface, rather than riding across it.

In the past the most popular type of traction band for heavy duty vehicles have been metallic traction surfaces.

Recently, elastomeric endless traction bands have become popular due to an increase in construction and in urban areas, where vehicles having traction bands must drive on the pavement and because there is a demand for vehicle use for low soil compaction farming, and over snow covered, very uneven, or muddy terrain. With the combination of elastomeric technology and a tremendous amount of trial and error, various types of elastomeric traction bands are now available in the industry. They are used on excavators, dump carriers, boring machines, combines, tractors, and the like.

While elastomeric endless traction bands are often desirable since they reduce damage to the terrain, reduce noise and allow access to various types of soil, they do have some drawbacks concerning their installation and removal. Once installed, the traction band is usually carried and maintained in tension by a plurality of rotating elements (wheels, sprockets, etc . . . ) that are connected to the vehicle. The traction bands being maintained in circwnferential contact with these rotating elements are being driven thereby (or, in the case of trailer-like non-driven vehicles, being supported for rotation thereon).

Metallic traction surfaces which are often formed by a number of individual pieces fastened together can be separated into a single strip thus allowing for easy installation onto the plurality of rotating elements. Elastomeric traction bands on the other hand are usually formed of a single continuous piece, and it is typically difficult and may require special equipment to mount them around the plurality of rotating elements, or remove them when maintenance or access is needed on the. vehicle. This is especially true with traction bands for heavy duty vehicles where the traction bands can weigh a substantial amount.

As elastomeric traction bands have grown more popular it has become apparent that the best way of installing a new traction band involves the removal of one or more of the wheels or other rotating elements from the vehicle. While the removal of the wheel rotating elements allows the traction band to be slid around the drive assembly with more ease, reinstalling the wheel rotating elements still may pose problems.

Elastomeric endless traction bands comprising only one row of lugs on its inner surface have been designed by Rodgers et al. (U.S. Pat. No. 6,296,329) Gleasman et al. (U.S. Pat. No. 6,135,220), Crabb (U.S. Pat. No. 5,312,176), Grawey et al. (U.S. Pat. No. RE37,174) and Burckhartzmeyer et al. (U.S. Pat. No. 5,749,423). The vehicle=s plurality of wheel provides a central spacing to receive the lugs of the traction bands, thus ensuring guidance to the band and power transmission, either by friction or by the lugs meshing in a sprocket drive wheel. Since those bands are sometimes used on very muddy or uneven terrains, the lack of a second row of lugs increases the chances of detracking occurrences of the band when lateral forces are too high.

Another typical endless traction band comes with a set of rows of drive lugs that are disposed on the outboard side of the plurality of wheels and one or more rows of central guide lugs, when viewed in a longitudinal direction. Tucker (U.S. Pat. No. 6,129,426) and co-pending patent application by Soucy et al. (U.S. Ser. No. 09/984,307) defines such an endless band. On top of power transmission, the drive lugs provides lateral support which prevents the disengagement of the traction band while the vehicle operates on irregular terrains and in the case of wrong maneuvers from operators. Installing such an endless traction band requires special tools in conjunction with a defined method of operation. The insertion of the protruding rows of drive lugs and guide lugs, which are located on the inner surface of the traction band, on each side and in the central spacing provision of the plurality of wheels represent a source of installation problems, due to the lack of radial space between the vehicle body and the its plurality of wheels.

Yamamoto et al. (U.S. Pat. No. 5,894,900) also proposes an endless traction band to be installed over pneumatic tires. Two rows of lugs on the inner surface of the band provides lateral support. The band can be installed and tightened easily by varying the air level in the tires.

Co-pending U.S. patent application from Deland et al. (Ser. No. 10/202,391) replaces the drive wheel or the tension wheel with a wheel which is made of several parts, when viewed in a lateral direction. When combined with a step by step method, the use of the split wheel ensures an easier installation of the endless band on the vehicle. This invention requires the modification of one of the plurality of wheels, but can work with the same endless band as before.

The present invention sets out to solve the problem associated with the installation or the removal of an elastomeric endless traction band by providing a special configuration of drive lugs and guide lugs on its inner surface. The drive lugs engage in the drive sprocket cavities and fills a double mandate by ensuring power transmission from the engine to the traction band as it offers lateral support on one side of the plurality of wheels on which the traction band is mounted on. Guidance and lateral support of the endless band is provided by the guide lugs.

SUMMARY OF INVENTION

The objective of this invention is to provide an innovative endless traction band which offers a workable solution to its installation problems, since such a traction band is mostly made from one single continuous elastomeric part, thus requiring special tools and manipulations during the installation process to ensure proper fit. The elastomeric endless traction band had originally been invented as a compromise to metal traction bands, proposing a wider range of commercial and residential applications for a tracked vehicle, with a lower cost and at a lower weight.

With the increase in popularity for such a elastomeric traction band came the necessity to provide the means for an easier installation process, since the traction band installation, removal and the maintenance procedures can sometimes be required in a variety of environments, or in remote and/or inconvenient locations.

This invention presents an endless traction band that integrates the knowledge of elastomeric technology with a special inner surface lug configuration, which consists of rows of lugs disposed along the circumference of the endless elastomeric traction band body. More particularly, the traction band comprises a row of lugs on the inboard side which has a lower height than the row of lugs on the outboard side. This invention further defines an endless traction band with a partial row of smaller lugs or, to the limit, no lugs at all on the inboard side of the traction band. By doing so, the installation process is simplified due to the fact that the lugs on the inboard side are usually more difficult to insert over the plurality of wheels.

When the endless band is installed on the vehicle, the invention is configured in such a way to preferably have the rows of lugs evenly positioned on each side of the plurality of wheels.

There is therefore provided a traction band for use over a plurality of wheels of a tracked vehicle, the traction band including an inner surface which faces the plurality of wheels, an inboard side which is defined as the most inboard area along the longitudinal length of the inner surface, a central side which is defined as the central area along the longitudinal length of the inner surface, an outboard side which is defined as the most outboard area along the longitudinal length of the inner surface and lugs which are disposed in rows along the longitudinal direction of the inner surface and which are located on the inner surface of the traction band, the lugs being located on the inboard side of the inner surface having a lower height than the lugs being located at the outboard side of the inner surface.

There is further provided an endless traction band for use over a plurality of wheels of a tracked vehicle allowing such vehicle to travel on a ground surface, the traction band including an inner surface which faces the plurality of wheels and an outer surface which faces the ground surface, the inner surface having an inward area, a central area, an outward area, a first series of lugs having a first height and which are disposed in rows in the inward area along the longitudinal direction of the traction band, a second series of lugs having a second height and which are disposed in rows in the outward are along the longitudinal direction of the traction band and a third series of lugs having a third height and which are disposed in rows in the central area along the longitudinal direction of the traction band, the first height being smaller than the second and third height.

Other aspects and many of the attendant advantages will be more readily appreciated as the same becomes better understood by reference to the following detailed description and considered in connection with the accompanying drawings in which like reference symbols designated like elements throughout the figures.

The features of the present invention which are believed to be novel are set forth with particularity in the appended claims.

BRIEF DESCRIPTION OF THE FIGURES

FIG. 3a is a top view of the inner surface of the elastomeric shown in FIG. 2a

FIG. 3b is a section view along line 1—1 in FIG. 3a.

FIG. 4a is a side view of the elastomeric traction band shown in FIG. 2a.

FIG. 4b is a detail view of the lateral guide lug shown in FIG. 4a

DETAILED DESCRIPTION OF A PREFERRED EMBODIMENT

Figure 1:
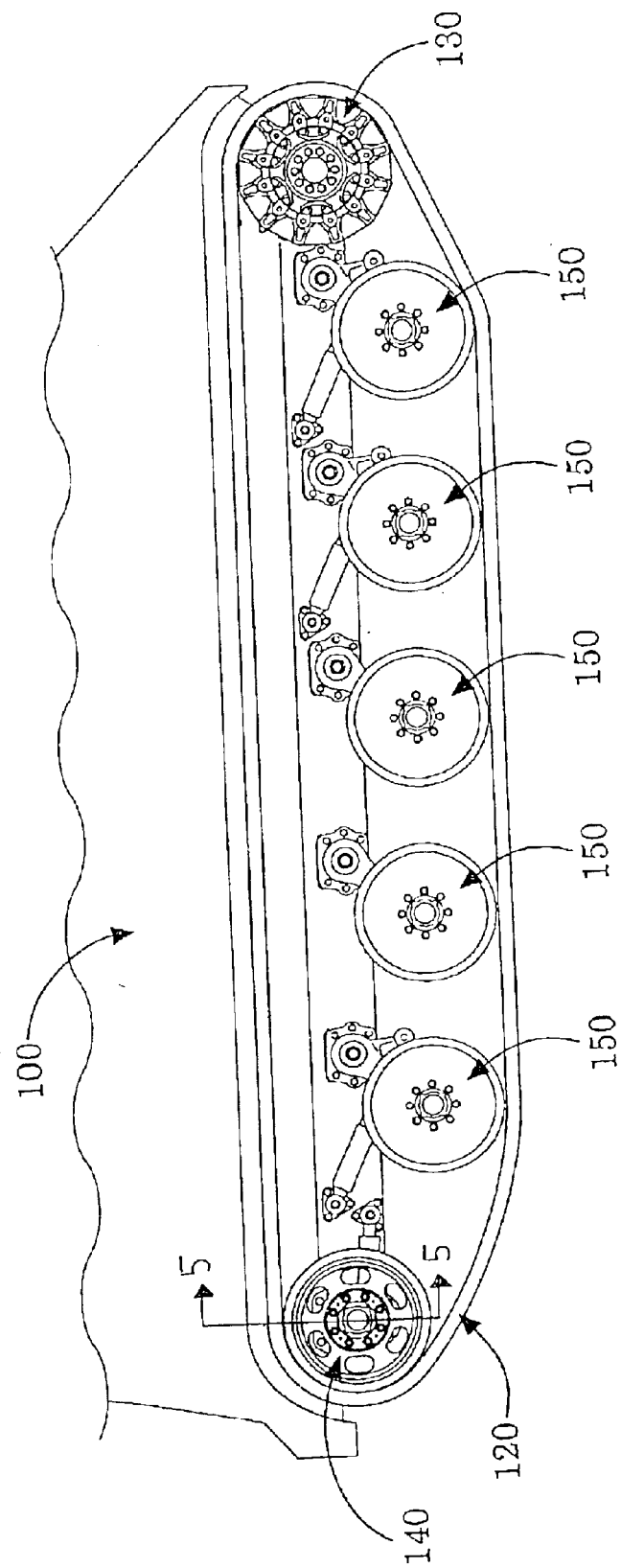
FIG. 1 is a side view of a tracked vehicle making use of an endless traction band with one lateral support in accordance with the invention.

FIG. 1, shows a general side view of an endless traction band with asymmetrical support, in accordance with this invention. In this embodiment, the vehicle 100 is equipped with an endless reinforced elastomeric traction band 120, a sprocket drive 130 which allow power transmission from the vehicle 100 to the traction band 120, a tension wheel 140 and a plurality of road wheels 150 which support the vehicle and guide the traction band 120. This system is coupled to appropriate drive means (not shown) through an appropriate suspension system (not shown). A similar system is disposed on the other side of the vehicle 100.

Figure 2A:
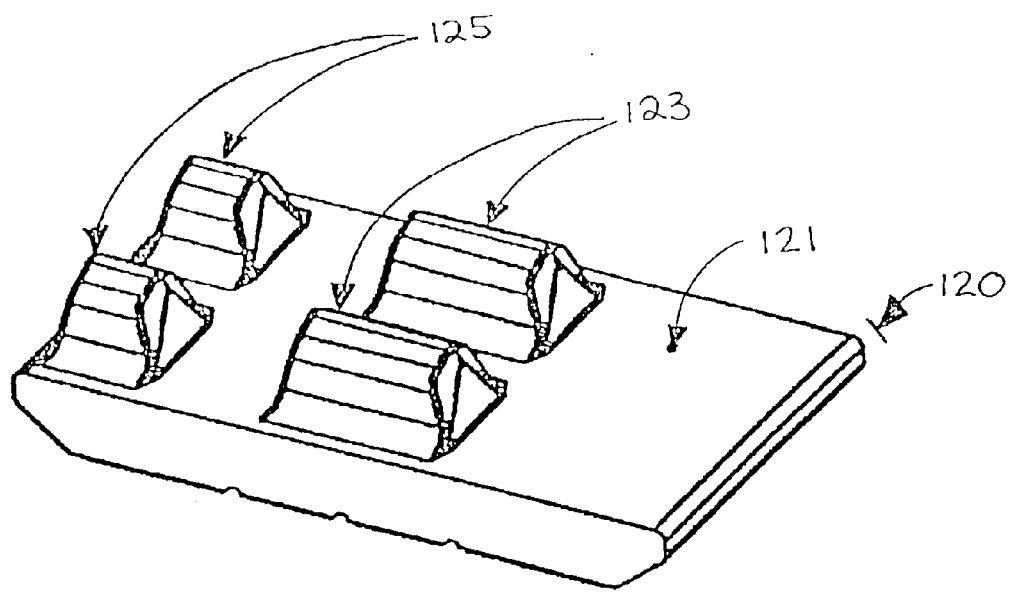
FIG. 2a is an isometric view showing the inner surface of the elastomeric traction band shown in FIG. 1.

A segment of the endless elastomeric traction band 120 is shown in FIG. 2a. It is defined by an inner surface 121 comprising central drive lugs 123 and lateral guide lugs 125 along the circumference of the endless traction band 120.

Figure 2B:
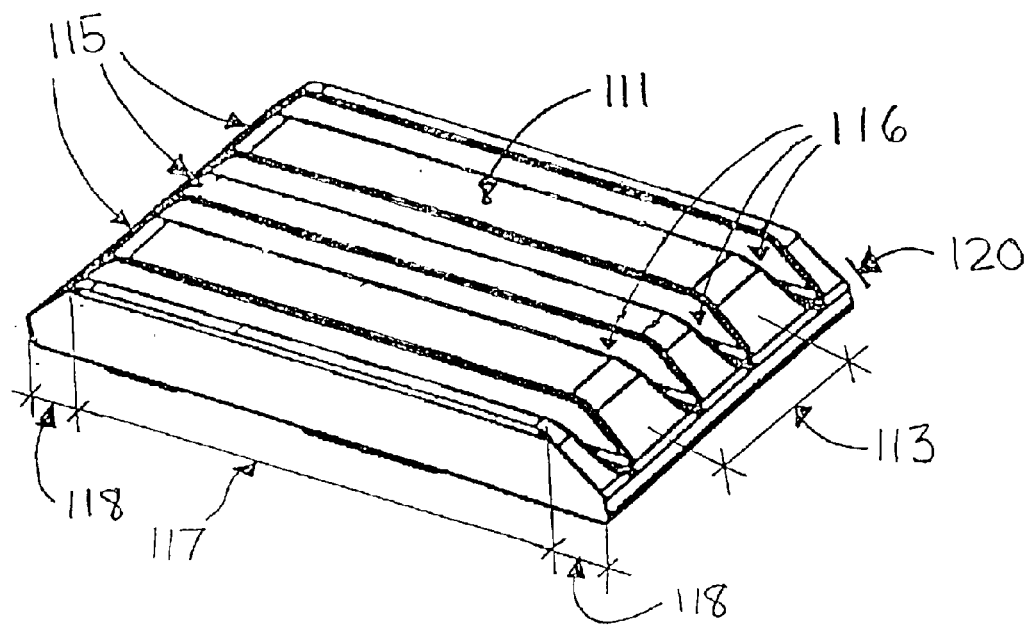
FIG. 2b is an isometric view showing the outer surface of the elastomeric traction band shown in FIG. 1.

The outer surface 111 illustrated in FIG. 2b shows a portion of the tread pattern selected to adapt to various types of soil. The tread pattern 113 consists in a series of equally spaced apart band profiles 115, which span over the entire lateral width of the endless elastomeric traction band 120. Each band profile 115 comprises a central section 117 and two lateral section 118 located on each side of the central section 117.

The elastomeric traction band 120 is lightweight and pliable, yet reinforced with high tensile strength cords (not shown). Lateral sections 118 of the traction band 120 are beveled to help prevent scuffing or damage when maneuvering on sod, turf and other sensitive surfaces. Each band profile 115 completely covers the central section 117 with an almost flat segment and is followed along the traction band circumference by an empty space 116. Preferably, the tread pattern 113 should be designed to provide stability in rotation along the vertical axis (twisting) and the longitudinal axis (torsion) of the traction band, therefore minimizing de-tracking occurrences.

FIGS. 3a, 3b, 4a, 4b and 5 show into more details a segment of the inner surface 121 of the traction band 120 and more particularly, the lugs configuration which sets ground for this invention. The outward area 124, the central area 126 and the inward area 128 receive the drive lugs 123 and the guide lugs 125, which are positioned in rows along the circumference of the traction band.

Figure 5:
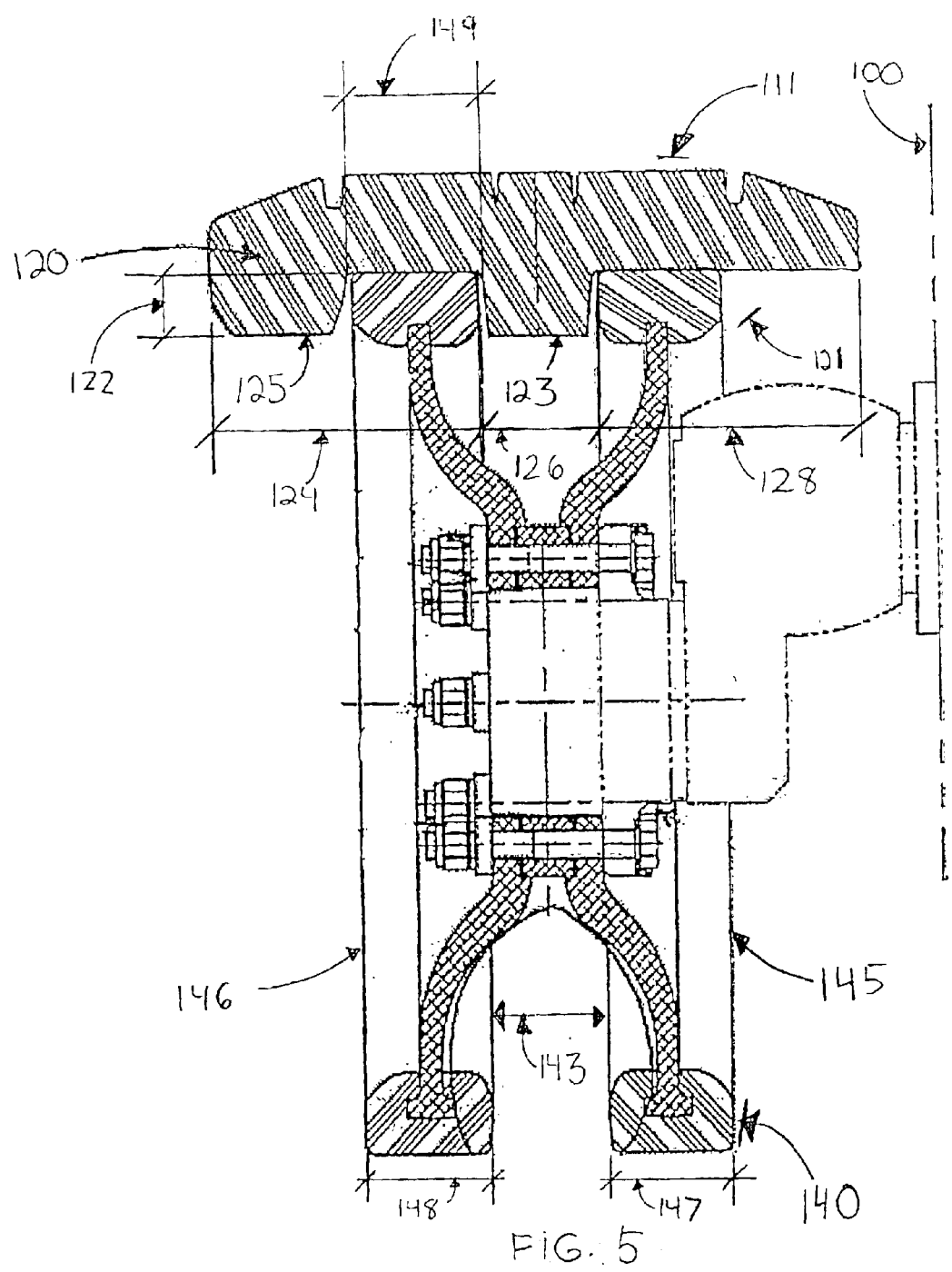
FIG. 5 is a schematic section view of the wheel-traction band assembly shown in FIG. 1.

The lug configuration on the inward area 128 is different than the one on the central area 126 and the one on the outward area 124. Since the inward area 128 is the first portion of the traction band 120 to be slid over the plurality of wheels, the height and the number of lugs have an effect on the installation process. FIG. 5 shows a partial section view of a traction band 120 when installed on the tension wheel 140, which is an assembly of an inward wheel section 145 and an outward wheel section 146.

Figure 6:
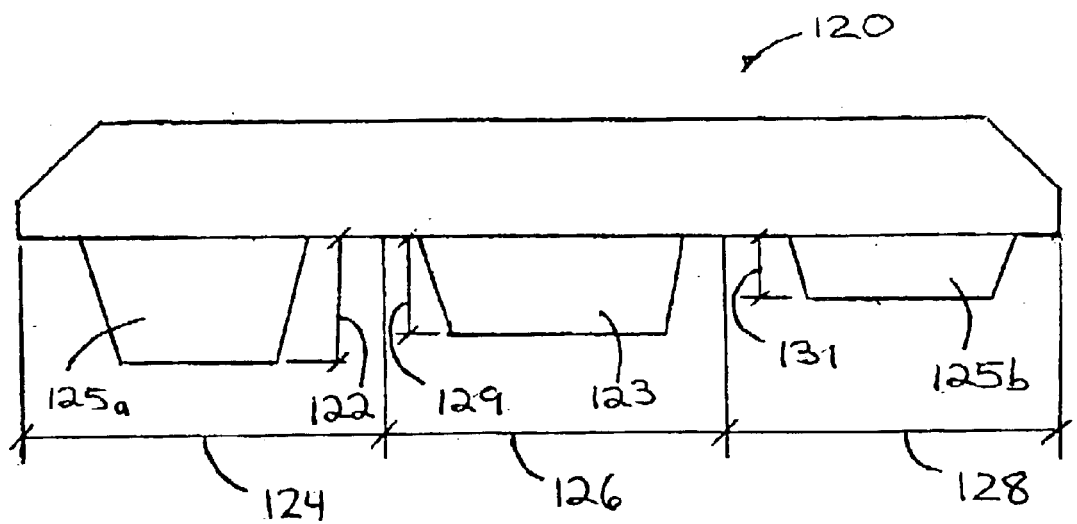
FIG. 6 is a side elevation view showing a second embodiment of the present invention.

To enhance the installation process of the traction band 120 on a tracked vehicle 100, the inward area 128 is defined with different lug configurations. The embodiment shown in FIG. 6 shows the traction band 120 which comprises a row of lugs 125b in its inward area 128 along its circumference. Each lug 125b has a height 131 which is less that the height 122 of the guide lugs 125a in the outward area 124, and which is less than the height 129 of the drive lugs 123 in the central area 126.

Figure 7:
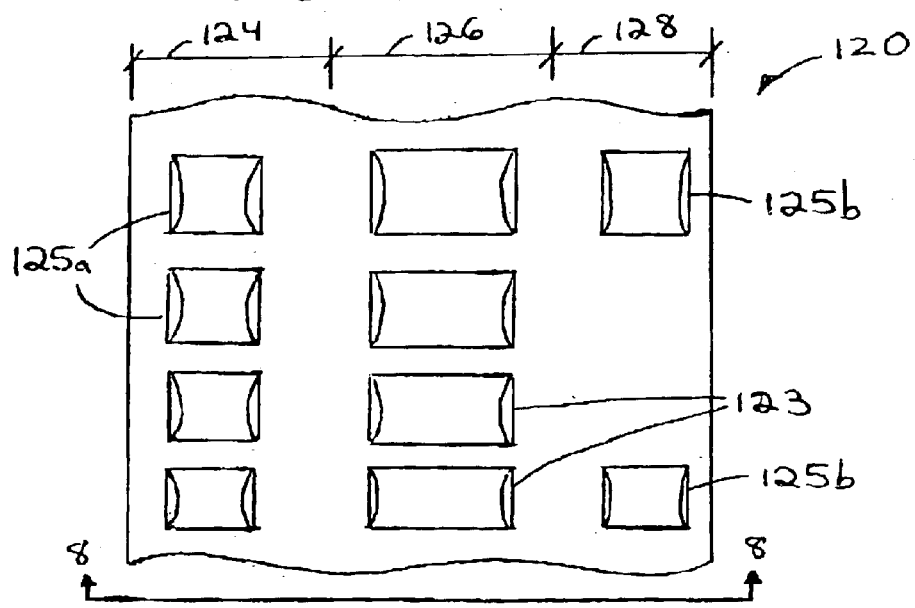
FIG. 7 is a top view showing a third embodiment of the present invention.
Figure 8:
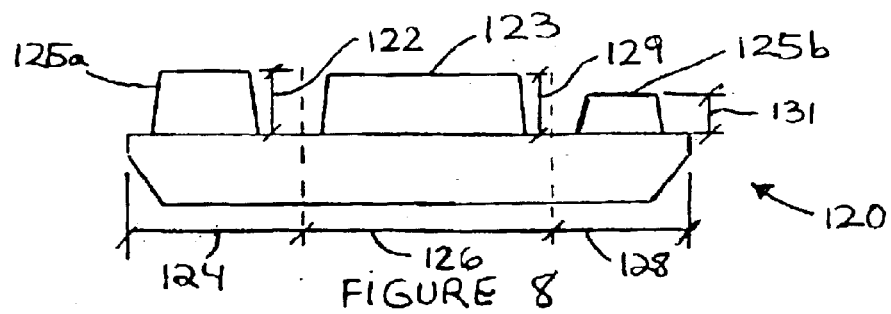
FIG. 8 is a side elevation view taken along line 8—8 in FIG. 7.

In the embodiment shown in FIGS. 7 and 8, the height 131 of the lugs 125b on the inward area 128 is still less than the height 122 of the drive and guide lugs (123, 125), but the number of lugs 125b on the inward area 128 does not cover the entire circumference of the traction band 120. The lugs 125b are still disposed in a row, but only cover, for instance, an arc or sequences of the entire circumference of the traction band 120.

Figure 3A:
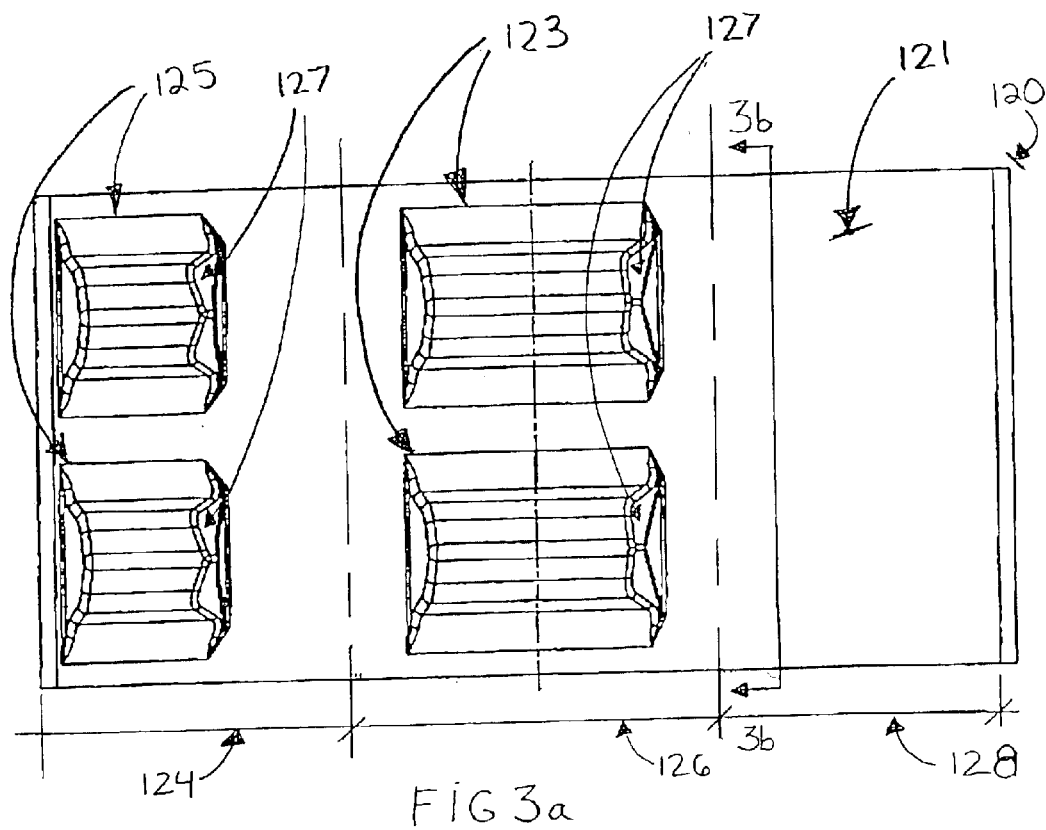
Figure 3B:
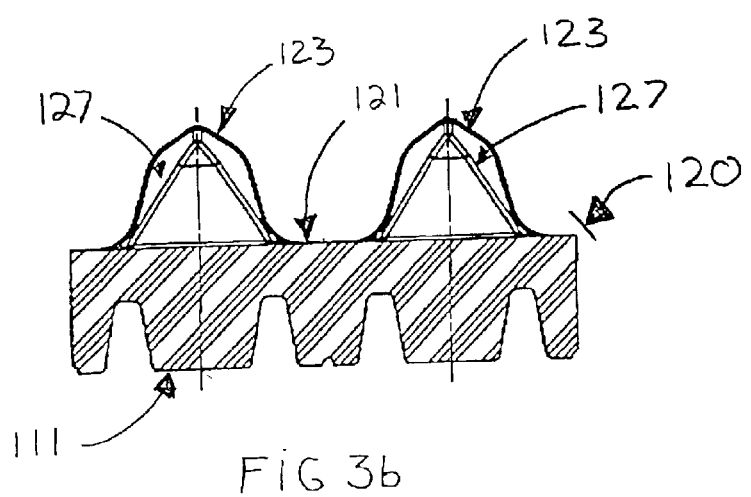
Figure 4A:
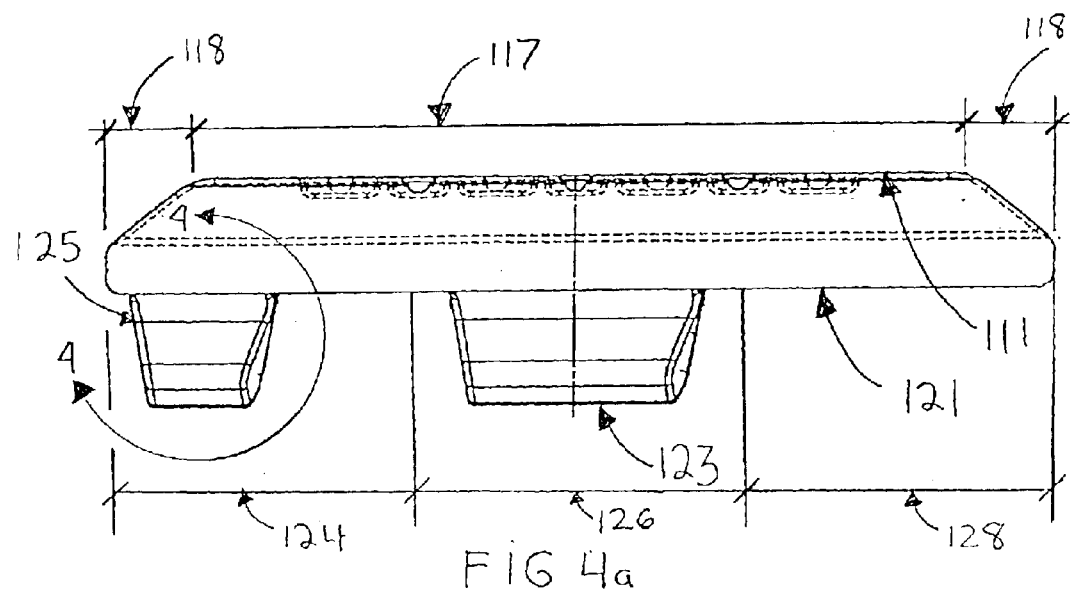
Figure 4B:
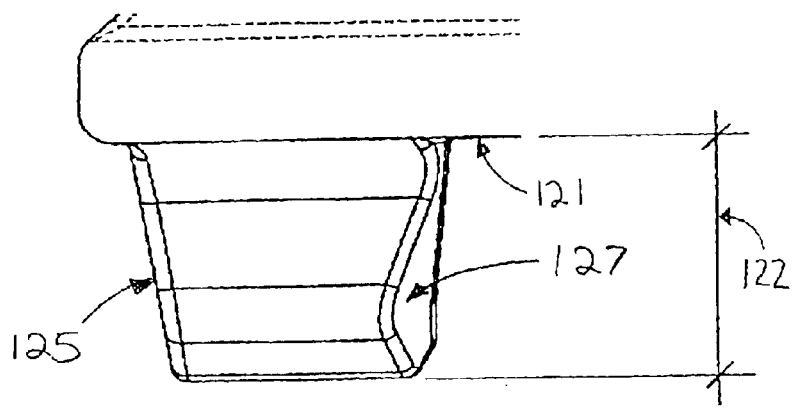

Lastly, the height of the lugs (not shown) on the inward area 128 is reduced to zero, so that no lugs are disposed on the inward area 128 of the traction band 120, like it is illustrated in the embodiment of FIGS. 3a and 4a and 5.

Since the lugs (not shown) located on the inward area 128 of the traction band 120 are either smaller along the circumference of the traction band 120, or smaller and not covering the entire circumference of the traction band 120 or simply not present, the inward area 128 can easily be slid over the inward wheel section 145, which is usually the area of the vehicle 100 where access is often limited or in existent. To complete the installation of the traction band 120 over the plurality of wheel (130,140,150), only the lugs of the central area 126 needs to be inserted inside the space 143 generated between the inward and outward wheel sections (145 and 146 in FIG. 5)

In the embodiment shown in FIGS. 2a, 3a, 3b, 4a, 4b and 5, a row of guide lugs 125 are disposed on the outward area 124 and a row of drive lugs 123 are disposed on the central area 126. No lugs appear on the inward area 128. This configuration could as well be reversed, by having the drive lugs 123 located on the inward area 128 and on the outward area 124 and by locating the guide lugs on the central area 126.

These lugs all have an angled profile 127 on their inward side in order to provide an engaging surface with the mating wheels as the traction band moves and rolls around them. These angled profiles 127 are not restricted to any shape and can also be added to the most outward side of the lugs.

As seen in FIGS. 1 and 5, the endless traction band 120 rotates around the tension wheel 140 and a plurality of road wheels 150. The row of drive lugs 123 are maintained in the spacing 143 between the inward wheel section 145 and outward wheel section 146. Since no power is transferred to those wheels 140, 150 and only lateral support and traction band alignment is provided to the vehicle 100 at those areas, the combination of a row of guide lugs 125 and a row of drive lugs 123 only allows for the axial rotation of the elastomeric traction band 120 with respect to the wheels 140, 150 and blocks all other possible rotational and translation movement of the wheel-traction band assembly.

The guide lugs 125 and the drive lugs 123 can have different shape and profile combinations, depending on the type of use the elastomeric endless band 120 has been selected for. In another embodiments (not shown), the drive sprocket wheels 130 could be made from an inner cylindrical part comprising the lug receiving cavities which would be assembled to an outer part acting as a wall and for which the lateral guide lugs 125 of the endless traction band 120 would provide lateral support. In still another embodiment, the drive sprocket 130, the tension 140 and road wheels 150 could be made from a one piece disk containing the drive lugs cavities (drive sprocket 130) or the spacing provision 143 (tension 140 and road 150 wheels).

While a preferred embodiment of the invention has been described herein, it should be apparent to those skilled in the art that variations and modifications are possible without departing from the spirit of this invention.

What is claimed is:

1. A traction band for use over a plurality of wheels of a tracked vehicle allowing such vehicle to travel on a ground surface, comprising:
    an inner surface which faces said plurality of wheels and an outer surface which faces said ground surface;
        said inner surface comprising an inward area, a central area and an outward area;
    a first series of lugs, having a first height and which are disposed in rows in said inward area, along a longitudinal direction of said traction band;
    a second series of lugs, having a second height higher than said first height and which are disposed in rows in said outward area, along the longitudinal direction of said traction band.

2. A traction band as claimed in claim 1, wherein the traction band is endless.

3. A traction band as claimed in claim 1, wherein a third series of lugs are disposed on the said central area and along the longitudinal direction of said traction band.

4. A traction band as claimed in claim 3, wherein said first series of lugs and said second series of lugs are guide lugs and said third series of lugs are drive lugs.

5. A traction band as claimed in claim 3, wherein said first series of lugs and said second series of lugs are drive lugs and said third series of lugs are guide lugs.

6. An endless traction band for use over a plurality of wheels of a tracked vehicle allowing such vehicle to travel on a ground surface, comprising:
    an inner surface which faces said plurality of wheels and an outer surface which faces said ground surface;
        said inner surface comprising an inward area, a central area and an outward area;
    a first series of lugs, having a first height and which are disposed in rows in said inward area, along a longitudinal direction of said traction band;
    a second series of lugs, having a second height and which are disposed in rows in said outward area, along the longitudinal direction of said traction band;
    a third series of lugs, having a third height and which are disposed in rows in said central area, along the longitudinal direction of said traction band;
wherein said first height is smaller than said second and third height.

7. A traction band as claimed in claim 6, wherein said first and third series of lugs are guide lugs and said second series of lugs are drive lugs.

8. A traction band as claimed in claim 6, wherein said first and third series of lugs are drive lugs and said second series of lugs are guide lugs.

9. An endless traction band for use over a plurality of wheels of a tracked vehicle allowing such vehicle to travel on a ground surface, comprising:

an inner surface which faces said plurality of wheels and an outer surface which faces said sound surface;
said inner surface comprising an inward area, a central area and an outward area;
a first series of lugs, having a first height and which are disposed in rows in said outward area, along a longitudinal direction of said traction band;
a second series of lugs, having a second height and which are disposed in rows in said central area along the longitudinal direction of said traction band.

10. A traction band as claimed in claim 9, wherein said first series of lugs are guide lugs and said second series of lugs are drive lugs.

11. A traction band as claimed in claim 9, wherein said first series of lugs are drive lugs and said second series of lugs are guide lugs.

12. A traction band as claimed in claim 1, wherein said first series of lugs includes a predetermined number of first lugs and said second series of lugs includes a predetermined number of second lugs, said predetermined number of first lugs being smaller than said predetermined number of second lugs.

13. A traction band as claimed in claim 1, wherein said first series of lugs are circumferentially positioned in sequences in said inward area and only on a portion of said traction band's circumference.

* * * * *